United States Patent
Pomerantz et al.

(10) Patent No.: US 8,213,912 B2
(45) Date of Patent: Jul. 3, 2012

(54) MOBILE SYSTEM FOR PROVIDING PERSONALIZED INFORMATION

(75) Inventors: Itzhak Pomerantz, Kfar Saba (IL); Eitan Mardiks, Ra'anana (IL); Rahav Yairi, Oranit (IL)

(73) Assignee: Sandisk IL Ltd., Kfar Saba (IL)

( * ) Notice: Subject to any disclaimer, the term of this patent is extended or adjusted under 35 U.S.C. 154(b) by 294 days.

(21) Appl. No.: 12/477,690

(22) Filed: Jun. 3, 2009

(65) Prior Publication Data

US 2010/0311394 A1 Dec. 9, 2010

(51) Int. Cl.
*H04M 3/42* (2006.01)

(52) U.S. Cl. .................................... 455/414.1; 455/466

(58) Field of Classification Search ............... 455/414.1; 709/217, 203, 219, 218, 213, 223; 715/234, 715/205; 235/383, 462.45; 704/E17.005, 704/999.101, 999.2; 707/E17.109, 999.01, 707/999.104, 999.2

See application file for complete search history.

(56) References Cited

U.S. PATENT DOCUMENTS

| | | | | |
|---|---|---|---|---|
| 7,117,504 B2* | 10/2006 | Smith et al. | | 719/328 |
| 2002/0112013 A1* | 8/2002 | Walsh | | 709/206 |
| 2003/0084108 A1* | 5/2003 | Syed | | 709/206 |
| 2003/0097451 A1* | 5/2003 | Bjorksten et al. | | 709/228 |
| 2004/0240408 A1* | 12/2004 | Gur | | 370/328 |
| 2005/0086211 A1* | 4/2005 | Mayer | | 707/3 |
| 2005/0165555 A1* | 7/2005 | Jackson | | 702/16 |
| 2006/0219780 A1* | 10/2006 | Swartz et al. | | 235/383 |
| 2007/0100967 A1* | 5/2007 | Smith et al. | | 709/219 |
| 2007/0276841 A1* | 11/2007 | Rhoads et al. | | 707/10 |
| 2008/0098005 A1* | 4/2008 | Goradia | | 707/10 |
| 2009/0217363 A1* | 8/2009 | Geller et al. | | 726/5 |

* cited by examiner

*Primary Examiner* — Jean Gelin
*Assistant Examiner* — Mahendra Patel
(74) *Attorney, Agent, or Firm* — Toler Law Group, PC (57) ABSTRACT

An information system includes a server that creates an information reservoir with data units for a user of a mobile communication device based on a unique user profile of the user of the mobile communication device. The server creates the unique user profile based on interaction of the user with the mobile communication device or with another computing system. The server transfers the information reservoir to the mobile communication device and each time the user requests data from a web site, the server scans it to find key terms. If the server finds key term(s) in the data, it uses a tagging rule to mark the key term(s) and, then, it transfers the data with the marked term(s) to the mobile communication device. The user may, then, select a marked key term to call/display a data unit that is locally stored on the mobile communication device. The server may also mark terms in data units and a data unit stored on the mobile communication device may be called using a key term that is marked in another data unit.

25 Claims, 5 Drawing Sheets

MOBILE SYSTEM FOR PROVIDING PERSONALIZED INFORMATION

FIELD OF THE INVENTION

The present invention generally relates to mobile communication systems and more specifically to a mobile system that provides personalized information.

BACKGROUND

Advanced cellular phones are used as platforms for consuming networked services such as services that are rendered through the Internet. Typically, such phones include an internet browser for surfing the Internet.

Typically, landline-based communication channels have a communication bandwidth (i.e., a rate of data transfer, or bit rate, measured in bits per second ("bps")) that is broader than the communication bandwidth of wireless-based communication channels. Generally, the broader the communication bandwidth of a communication channel, the higher the rate of data transfer over the communication channel. Communication bandwidth, therefore, is a 'priced resource', which means that the broader the communication bandwidth consumed by a subscriber, the higher its cost would be to the subscriber.

Despite the on-going effort to speed up browsing speed of cellular phones, surfing the Internet via cellular phones is oftentimes annoying because the surfing speed of the phones is annoyingly slow relative to surfing speed of devices (e.g., Personal Computers) that have physical access to the Internet via a landline.

"HTML" (an abbreviation of "HyperText Markup Language") is the predominant markup language for Web pages. HTML describes the structure of text-based information in a document by denoting certain text as links (which are called "hyperlinks"), headings, etc., and supplements that text with interactive forms, embedded images, and other objects such as widgets. HTML can also describe, to some degree, the appearance and semantics of a document, and can include embedded scripting language code (e.g., Java Script) that can affect the way Web browsers and other HTML processors handle documents. When a phone's user surfs the Internet, HTML pages are displayed on the phone's display. A hyperlinked text, called "hypertext", on a currently displayed HTML page, when selected by the user, calls for another HTML page. Usually, hypertexts that call for other HTML pages are "public", or "global", which means that when a particular phone's user serfs the Internet, HTML pages (and the hyperlinks pointing at or referencing them) are not personalized; i.e., the same hyperlinks can likewise be used globally; i.e., every phone's user who uses a particular global hyperlink would essentially get the same HTML page.

Oftentimes when phone users select public/global hyperlinks (e.g., by "clicking" on them), they receive HTML pages that they are not interested in. Receiving unwanted HTML pages exacerbates the problem discussed above (i.e., annoying surfing experience) because phone users typically have to wait a considerable amount of time for HTML pages to be wirelessly downloaded onto their cellular phones. In addition, downloading of HTML pages that the user is not interested in may undesirably have to be repeated, thus increasing the wasted time and the annoyance level.

Hyperlinked texts are tagged (or, more generally, "marked") terms/texts. Terms in HTML pages are marked using "Smart Tag" and "Autolinks" or similar tagging techniques. Briefly, "Smart tag" is a selection-based search feature that is used in some versions of Microsoft Word and in Internet Explorer 6 and Internet Explorer 8 web browsers by which an application recognizes certain words or types of data and converts them to a hyperlink. Within a web browser, a smart tag underlines the words it has been pre-programmed to react to, and inserts its own hyperlinks. A click on a hyperlink by a user takes the user to wherever the smart tag developer wants to take her/him. Briefly, "Autolinks" is a feature that, when activated, generates, on-the-fly, web links to web content in modules from text within the content. For example, if some content contains a name of a person, the Autolinks may be configured to identify the person's name and to assign to it a hyperlink to the person's personal web site.

Traditional marking of HTML pages is based on detection of textual patterns and words/terms in the displayed text, and on automatic linkage between detected textual patterns and words/terms to resources and to additional information (e.g., another HTML page). However, the additional information is not personalized and, therefore, may often be of limited interest or value to the user. For example, smart tags link to terms in texts that are contained in databases of local applications, and, therefore, they cannot be applied to terms that are displayed; e.g., on a PC's display device for the first time. AutoLinks are not personalized and they link the user to networked resources. Another tagging technique that is known as "Enriched Surfing" links the user to external network links.

Currently, some web sites are designed to provide personalized HTML pages to user devices, and some other web sites that are incapable of providing such information use a network server that performs that task. Regardless of whether a web site is capable of providing personalized information to a user device or uses a network server for that purpose, the user's device receives the personalized information only in real-time, meaning that the personalized information resides solely in the web site or in the network server servicing the web site, and the user's device has to be online (i.e., it has to communicate with the web site or network server) continuously in order to be able to receive personalized information. If the user's device is a wireless device (e.g., a cellular phone), the requirement for the device to be continuously online is problematic, for example because of the drawbacks resulting from the relatively small communication bandwidth of the wireless communication link, as explained above.

There is therefore a need to provide personal information to users of mobile communication devices more efficiently, both content-wise and speed-wise.

SUMMARY

In view of the foregoing, it would be beneficial to have a system that provides a user with information that is stored locally on the user's device, and whose content is personalized to the user based on user profile information.

An exemplary information system for providing information prepares an information reservoir that is personalized for a particular user/subscriber of the information system, or is dedicated for a particular purpose, for example, based on key terms that are frequently or extensively used by the user, or based on other criteria. The information system selects the key terms according to or based on an activity profile that is unique to the particular user. The activity profile that is unique to the particular user is referred to herein as a "user's unique activity profile", or a "user profile" for short. The unique user profile is derived from various prior (i.e., monitored and recorded) activities and interactions between the user and the information system.

The personalized information reservoir may include a set of one or more data units that may originate from different web sites or data sources. The size, and in turn capacity, of the personalized information reservoir may be limited by predetermined criteria. The predetermined criteria may be a maximum size of a storage space that is available or allocated, for example on a mobile communication device of the user, for the personalized information reservoir. The predetermined criteria may be set by a subscription agreement. For example, a personalized information reservoir may include up to 10 data units for each key term or up to 60 data units for all the key terms, etc.

After the personalized information reservoir reaches its maximal predetermined capacity, the information rendering system sends it to the user's mobile communication device where it can be used locally by the user. The information rendering system also sends the key terms to the user's mobile communication device in order to enable the user to use the personalized information reservoir. The information system sends the personalized information reservoir and the related key terms to the mobile communication device of the user at times during which the user does not need it, e.g., during idle periods. The personalized information reservoir and the key terms are related in the sense that each key term is logically linked to one or more data units of the personalized information reservoir.

Sending the user's information reservoir and the pertinent key terms to the user's mobile communication device ends a preparation process. With this process done in advance, the user of the mobile communication device can experience local, and therefore fast and free, Internet surfing by browsing through the data units of the locally stored personalized information reservoir.

If the mobile communication device sends a request to the information system for content/data, the information system retrieves the content, for example from a web site, and sends it to the mobile communication device. However, before the information system sends the content to the mobile communication device it searches the content for terms that are identical or similar to the key terms, and if it detects such terms, it marks them and sends the content to the mobile communication device with the marked terms. Assuming that the mobile communication device displays the content with the marked terms on a display device, if the user of the mobile communication device selects a particular marked term (e.g., by clicking on it), the mobile communication device retrieves one or more of the data units of the locally stored personalized information reservoir that are referenced by the selected marked term and displays them on the display device of the mobile communication device.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

It will be appreciated that for simplicity and clarity of illustration, elements shown in the figures are not necessarily drawn to scale. Further, where considered appropriate, reference numerals may be repeated among the figures to indicate the same, like, corresponding, or analogous elements.

DETAILED DESCRIPTION

The description that follows provides various details of example embodiments. However, this description is not intended to limit the scope of the claims but instead to explain various principles of the invention and the manner of practicing it.

Figure 1:
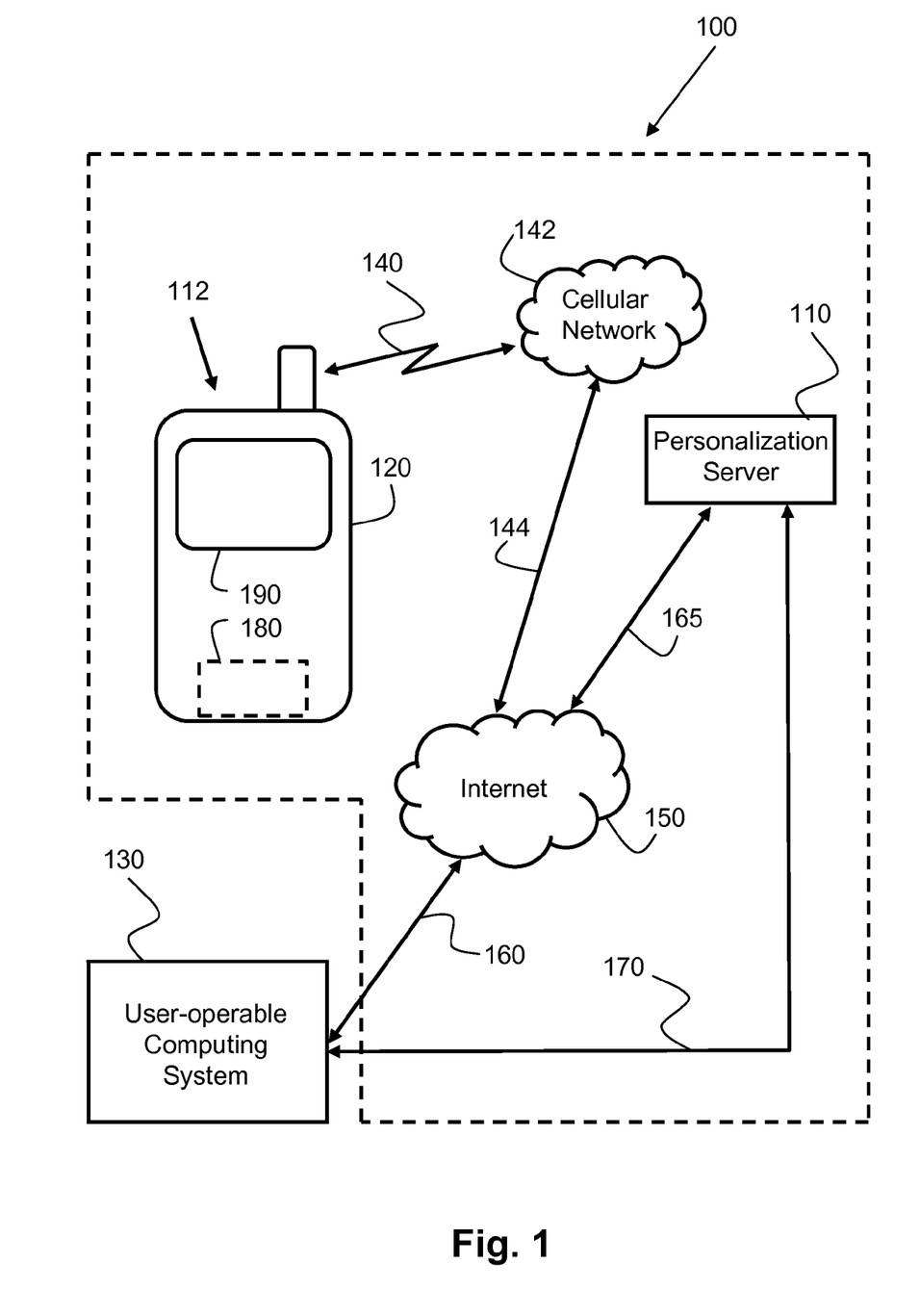
FIG. 1 is a general information rendering system according to an example embodiment.

FIG. 1 is an information system 100 for providing personalized information according to an example embodiment. Information system 100 includes a personalization server 110 and a mobile communication system 1 12. Mobile communication system 112 includes a mobile communication device 120, a storage device 180, and a client application that is not shown in FIG. 1.

Information system 100 provides an information reservoir to a user of mobile communication device 120 which is personalized to the user, and such information reservoir is referred to herein as a "personalized information reservoir". By "personalized to the user" is meant that the data/information content of the information reservoir is selected in a manner to be in accord with the user's preferences and fields of interest. Personalization server 110 and mobile communication device 120 are provided with Internet browsing capability. Personalization server 110 has a direct access 165 to Internet 150 and mobile communication device 120 can access Internet 150 only through cellular network 142; i.e., provided that a service agreement between mobile communication device 120 and the operator of cellular network 142 permits such access. Cellular network 142 is connected 144 to Internet 150.

A server of the operator of cellular network 142 provides calling services and Internet services (i.e., connecting 144 mobile communication device 120 to Internet 150 and facilitating Internet surfing), etc. Personalization server 110 provides to mobile communication device 120, via Internet connection 144 and through mobile communication device 120, various types of information and content related services. Typically, the user of mobile communication device 120 has to subscribe to services that are provided by the operator of cellular network 142 and by personalization server 110.

Assuming that mobile communication device 120 is a cell phone or the like, its user can browse Internet 150 only via cellular network 142 because cell phones communicate via cellular network 142, which is operated by a service provider. The services, including Internet services, which the service provider operating cellular network 142 provides to cell phones, depend on subscription's terms. Therefore, any communication between cell phone 120 and Internet 150 is done via a wireless communication link 140 and via cellular network 142. Unlike mobile communication device 120, a user-operable computing system 130 is connected to Internet 150 directly, over landline 160 that may consist (at least in part) of an electrical wire, or fiber optics, or both.

The rate of data transfer via wireless communication channel 140, which is typically a cellular network based communication channel, is much lower than the rate of data transfer via landline 160, and typically more expensive, because a landline based communication link can sustain a greater communication bandwidth relative to a wireless communication link, as explained above. Practically, this means that, comparing to user-operable computing system 130, it would take mobile communication device 120 more time to download the same amount of data from Internet 150 through cellular network 142 and via wireless communication link 140. In order to mitigate the problem associated with slow Internet surfing on mobile communication device 120, and in order to provide data to the mobile communication device 120, personalization server 110 (i) "learns" surfing patterns and preferences of the user of mobile communication device 120; (ii) evaluates the user's surfing patterns and preferences; (iii) uses the evaluation results to create a personalized information reservoir in a manner for it to be in accord with the user interests and preferences; and (iv) stores the personalized information reservoir in the user's device, in this example in mobile communication device 120. The user of mobile communication device 120 can have regular browsing experience, except that information within the personalized information reservoir is browsed locally, on mobile communication device 120, and, therefore, without any communication-related delays.

A first step in creating the personalized information reservoir by personalization server 110 involves creating a user profile that is unique to the user of mobile communication device 120. Then, personalization server 110 collects information for the user of mobile communication device 120 in accord with the unique user profile.

The unique user profile is created based on activity information that pertains to the way the user of mobile communication device 120 operates and interacts with mobile communication device 120 and/or with user-operable computing system 130, and/or, optionally, with another device; e.g., with personalization server 110. The activity information typically contains information pertaining to the user's surfing patterns, surfing preferences, etc. Personalization server 110 may learn the user's surfing patterns and preferences, for example, through usage of mobile communication device 120, or through usage of user-operable computing system 130, or through usage of both mobile communication device 120 and user-operable computing system 130. The learning process may include, or be based on, evaluation of surfing and surfing-related information that are transferred from mobile communication device 120 and/or from user-operable computing system 130 to personalization server 110, and/or on textual evaluation of contents that are transferred to or from mobile communication device 120 and/or to or from user-operable computing system 130. Some of the surfing and surfing-related information and/or evaluated contents may pertain, for example, to incoming e-mails and/or to outgoing e-mails. Clicking/selecting hyperlinks, copying certain texts or files, navigating or scrolling to certain locations in textual content, etc., are exemplary user activities. Surfing-related information may pertain, for example, to the type, origin, or title of documents that the user requests from (i.e., via) Internet 150.

Activity information pertaining to the user activity on mobile communication device 120 may be aggregated in or by mobile communication device 120 and transferred to personalization server 110 via cellular network 142 and over wireless communication link 140. Activity information pertaining to the user activity on user-operable computing system 130 may be aggregated in or by user-operable computing system 130 transferred to personalization server 110 indirectly, via Internet 150 and landlines 160 and 165, or directly, via landline 170. Additionally or alternatively, personalization server 110 may be configured as, or function as, a proxy server in order to allow it to monitor all or selected interactions between mobile communication device 120 and personalization server 110, and/or all or selected interactions between user-operable computing system 130 and personalization server 110, and, in general, every data and content that are transferred via Internet 150 and are related to the user of mobile communication device 120. By way of example, any communication between user-operable computing device 130 and web sites that are connected to Internet 150 may be performed via personalization server 110. Personalization server 110 may aggregate activity information based on the monitored interactions and monitored data transfers.

The unique user profile may be created in or by personalization server 110 from the activity information aggregated by mobile communication device 120 and/or by user-operable computing system 130 and/or by personalization server 110. Alternatively, the unique user profile is created in or by user-operable computing system 130 (for example) and provided to personalization server 110.

After personalization server 110 creates the unique user profile (or after it receives it from an external source, as explained above), it uses it to collect documents, which are referred to herein as "data units", from various data sources (and optionally from a self-maintained data bank). By "data unit" is meant a single piece of information (e.g., a translation of a term from one language to another, an interpretation of a technical term, etc.) or a single document (e.g., Microsoft Word document, a spreadsheet; e.g., a Microsoft Excel document, a "PDF" document, an HTML page, etc.). A data unit may also be an encyclopedia page, a lexicon or a dictionary (e.g., a linguistic dictionary, a technical dictionary, and the like), a widget, and an applet. Computing system 110 creates the personalized information reservoir from such data units.

Personalization server 110 transfers the personalized information reservoir (i.e., the data units) to mobile communication device 120 via cellular network 142 and over wireless communication link 140, for example during idle or stand-by periods. Mobile communication device 120, then, stores the data units in a storage device 180 that may be embedded in or removably connected to mobile communication device 120.

Each data unit that is stored on mobile communication device 120 can be referenced (i.e., called) by a term that personalization server 110 marked in a web page, or in another type of document (e.g., in a ".pdf" document), before the web page (or the document of the other type) was transferred to mobile communication device 120 via wireless communication link 140, and/or by a term that personalization server 110 marked in another data unit before personalization server 110 transferred the data unit to mobile communication device 120.

Marking a term involves applying a tagging rule to the term in order to make it user-interactable in a manner specified by the tagging rule. For example, a tagging rule may convert a non-hyperlinked textual expression to a hyperlinked textual expression and specify a data unit to which the hyperlinked textual expression should be linked. The tagging rule may additionally or alternatively specify the way the term, or its background, should be displayed on a display device 190 of mobile communication device 120. For example, the term may be underlined, or the background of the term may have a conspicuous color, or shape, etc. In some instances (depending on a tagging rule applied to a term), marking a term in a document (e.g., in a ".pdf" document) by personalization server 110 may only specify the way the term is to be presented (e.g., displayed) to a user of mobile communication device 120.

Mobile communication device 120 may be a mobile device, for example a mobile computer or a mobile phone; e.g., a cellular phone. User-operable computing system 130 may be, for example, a personal computer ("PC"), a portable personal computer, a laptop computer, a Personal Digital Assistant ("PDA"), and the like. Computing system 130 is "user-operable" as it includes a user interface (not shown in FIG. 1) that allows users to use various applications, for example Microsoft "Outlook", Internet browsing, etc. Personalization server 110, on the other hand, is not user-operable as it is handled (i.e., managed, maintained, etc.) by others, for example by a service provider who operates cellular network 142. The service provider may be, for example, a Mobile Network Operator ("MNO"), which is also known as Wireless Service Provider, Wireless Carrier, Mobile Phone Operator, or cellular company. An MNO is a telephone company that provides various services, such as call services, voice mail and access to the Internet, to mobile phone subscribers. Personalization server 110, mobile communication device 120, and user-operable computing system 130 are shown in more detail in FIG. 2, which is described below.

Figure 2:
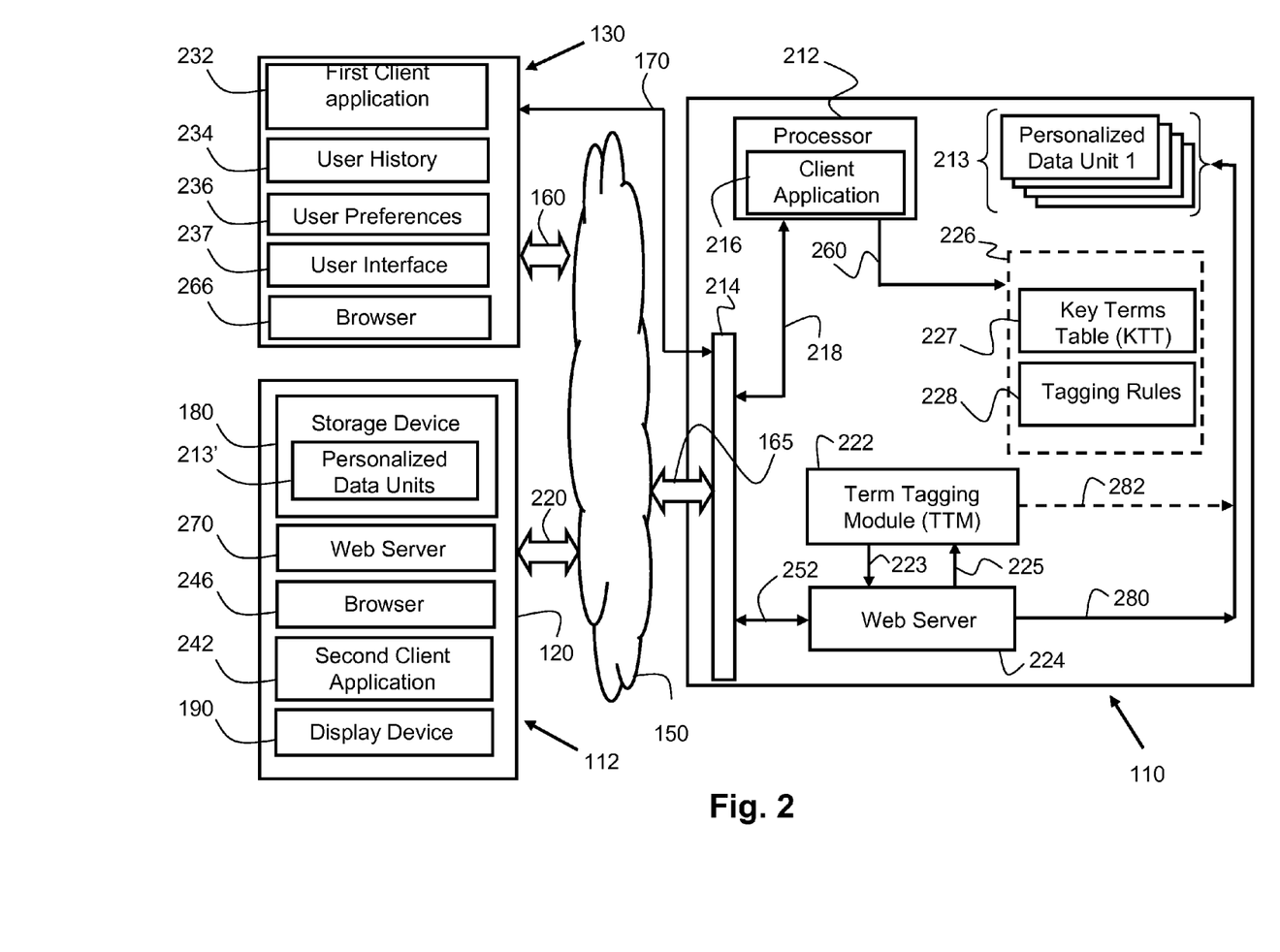
FIG. 2 is a block diagram of a general information rendering system according to an example embodiment.

FIG. 2 is a more detailed block diagram of an information system according to an example embodiment. FIG. 2 will be described in association with FIG. 1. Like in FIG. 1, the information system includes personalization server 110 and mobile communication system 112.

Personalization server 110 includes a processor 212, a communication interface 214 that facilitates communication with computing systems via Internet 150 and communication path 254, a web server 224, and a client application 216 that is executable on processor 212. Communication interface 214 is operatively connected 218 to processor 212 and enables communication between processor 212 and, for example, mobile communication device 120, over communication path 220, and user operable computing system 130, over communication path 160. Referencing also FIG. 1, communication path 220 includes wireless communication link 140, cellular network 142, and Internet connection 144. Mobile communication device 120 includes a transceiver that facilitates the wireless communication with cellular network 142.

Personalization server 110 may provide information and information-related services to many users that may use a communication device similar to mobile communication device 120. Therefore, if personalization server 110 services n users, it manages n unique user profiles: one unique user profile for each user. By way of example, FIG. 2 shows only one user profile; i.e., user profile 226, which is unique to the user (or to one of the users) of mobile communication device 120. Because personalization server 110 may cooperate with, and receive information from, many devices similar to mobile communication device 120, personalization server 110 has to associate information that it receives from a particular device with the correct user in order to create for the user a correct user profile. Personalization server 110 can know which information is related to which user by receiving a device identifier from the device it operates with, and by comparing a received device identifier to a user-device association list. Alternatively, personalization server 110 knows which information is related to which user by receiving user credentials from the device operated by the user. Such credentials would allow personalization server 110 to associate each information with the correct user and, thus, with the correct user profile. Personalization server 110 may store a user-device association list, or users' credential information in a non-volatile memory. The non-volatile memory is not shown in FIG. 2.

Processor 212, or application 216 that is executed on processor 212, may obtain user profile 226 from an external device that can be, for example, user-operable computing system 130 or mobile communication device 120, or from another device or system. Personalization server 110 can alternatively create user profile 226 from information that it receives from user-operable computing system 130 and/or from mobile communication device 120, and/or from another device, application or system.

Personalization server 110 also includes a Term Tagging Module ("TTM") 222 for identifying, on-the-fly, key terms in content (e.g., in HTML pages) that personalization server 110 retrieves for mobile communication device 120 via Internet 150 by using web server 224. The word "term", as used herein, means a characters string, a word in a predetermined language, a combination of words, and an expression that has a predetermined textual or lexicographic pattern or meaning. A key term is a term that a user uses intensively or frequently, or a term that is associatively related to another word. For example, the words "whale", "seal", "sea-lion", and "dolphin", are associatively related, as all of them designate marine mammals. Therefore, if the word "seal" (for example) is repeated many times in one or more documents, web pages, e-mails etc., it may be assumed that the user using the word "seal" or requesting the document/web page that includes the word "seal", is likewise interested in other marine mammals. Therefore, it may be decided in advance (e.g., defined by a corresponding tagging rule) that other words that designate other marine mammals; e.g., "dolphin" and "whale", may be regarded as "key terms" as well. That is, the word "seal" may be regarded as a "key term" by virtue of actual usage/consumption by the user, whereas the other words (in this example "dolphin" and "whale") may be regarded as "key terms" by virtue of association (i.e., by being associated to the word "seal").

TTM 222 also marks/tags the identified key terms. The motivation for identifying and marking/tagging terms in data is explained below. User profile 226 includes a Key Terms Table ("KTT") 227 and a set of Tagging Rules 228, the function of which is described below. Briefly, KTT 227 is used to create personalized information reservoir 213 (i.e., to collect data units in accord with specific user's interest and preferences), and Tagging Rules 228 is used to mark terms in web pages, in documents, etc., that pass 252 from web server 224 to mobile communication device 120 via Internet 150, and also terms in data units, if these terms are identical or similar to key terms that are listed in, or held by, KTT 227. Saying that a user profile includes a list of key terms such as KTT 227 and a set of tagging rules such as Tagging Rules 228 and saying that the user profile is defined by such list and rules can be deemed as equivalents.

User-operable computing system 130 includes a browser 266 for surfing Internet 150 in a conventional way. As shown in FIGS. 1 and 2, user-operable computing system 130 can communicate with personalization server 110 directly; i.e., via landline 170, or indirectly; i.e., via Internet connections 160 and 165.

User-operable computing system 130 also includes a non-volatile memory (not shown in FIG. 2) and a first client application 232 that facilitate recording information that pertains, for example, to activities of the user of user-operable computing system 130 such as browsing activities, exchanging e-mails, making selections by the user, etc. First client application 232 may also facilitate recording information that is related to, results, or derived from such user's activities. User-operable computing system 130 transfers the recorded information, which is referred to herein as "User History" 234, to personalization server 110 which uses it to create user profile 226, or part thereof.

Regarding tagging rules, user-operable computing system 130 may present to the user (e.g., by using a display device) a list of available or valid tagging rules, and the user may select one or more tagging rules from the list. User-operable computing system 130 may, then, transfer the user's selection to personalization server 110 via communication path 160 or via landline 170. The tagging rules selected by the user are shown in FIG. 2 as "Tagging Rules 228". The tagging rules available for selection by the user may be predetermined by the operator or owner of personalization server 110 and transferred to user-operable computing system 130 in a manner to facilitate the user selection. The tagging rules actually selected by the user for use, or information related to the user's selection, are shown as a User Preference 236. After user-operable computing system 130 transfers User Preference 236 to personalization server 110; e.g., via communication path 170, personalization server 110 stores the tagging rules as "Tagging Rules 228". Alternatively, the user may access a personalization web site associated with personalization server 110 by using a username and a password, and use the personalization web site to input her/his preferences; e.g., tagging rules, etc.

First client application 232 may also allow the user using user-operable computing system 130 to enter key terms at will, and User Preference 236 may also include information that pertains to the user selected key terms. The user of user-operable computing system 130 (which is also the user of mobile communication device 120) may select tagging rules from the list of tagging rules and input her/his key terms by using a user interface such as user interface 237.

Each of User History 234 and User Preference 236 may include, or data contained therein may be associated with, user credentials that associate them with the user of mobile communication device 120 because, as explained above, personalization server 110 may provide information and services to many users/devices and each information that personalization server 110 receives (e.g., from user-operable computing system 130 or from mobile communication device 120) has to be associated with the correct user in order to facilitate correct generation of a user profile for each user.

Responsive to receiving User History 234 and User Preferences 236, processor 212 uses client application 216 to create user profile 226 that is unique to the user of mobile communication device 120. Processor 212 evaluates User History 234 in a manner to identify terms that are used by the user; e.g., frequently or extensively. If processor 212 finds such terms, it adds them (shown at 260), and, optionally also linguistic derivatives thereof, to KTT 227 as key terms. Processor 212 determines whether a term is used; e.g., frequently or extensively by using one or more rules that may be predefined by the pertinent user, or by using a default set of rules. Processor 212 adds tagging rules to Tagging Rules 228 (the addition is shown at 260), which correspond to the key terms held in KTT 227. The tagging rules that processor 212 adds to Tagging Rules 228 may be provided to processor 212, for example as part of User Preferences 236, as explained above, or from another source.

Alternatively, first client application 232 may use User History 234 and/or User Preferences 236 to create user profile 226, or only part thereof, i.e., first client application 232 may create only KTT 227 or part thereof, or only Tagging Rules 228 or part thereof, or part of KTT 227 and part of Tagging Rules 228. If first client application 232 creates user profile 226 (or part thereof), it transfers user profile 226 (or part thereof), to personalization server 110 over communication path 160 and 165. Regardless of whether personalization server 110 receives user profile 226 (or part thereof) or creates it internally wholly or partly, processor 212 may enhance user profile 226 by processing or evaluating information and browsing commands/requests that traverse web server 224, communication path 220, or communication path 160. Personalization server 110 may function as a proxy server in a manner to allow it to monitor, process, and evaluate the information and browsing commands/requests traversing web server 224, communication path 220, and communication path 160.

Mobile communication device 120 includes a second client application 242, a storage device 180, and a browser 246 by which the user of mobile communication device 120 can perform global surfing (i.e., conventional surfing through Internet 150), or local surfing, as explained herein.

A hyperlinked textual expression (i.e., a marked term) in content (e.g., in a web page or in a data unit) that references a data unit that resides in mobile communication device 120 (i.e., a hyperlink referencing a locally stored data unit) is referred to herein as a "local hyperlink". A term functioning as a local hyperlink may be thought of as "locally marked". A hyperlinked textual expression that references data/content that does not reside in communication device 130 (i.e., it may reside; e.g., in a remote web server) is referred to herein as a "global hyperlink". A term functioning as a global hyperlink may be thought of as "globally marked". If, for example, the user of mobile communication device 120 selects/activates (e.g., by clicking) a local hyperlink in content that is displayed on display device 190 of mobile communication device 120, a data unit within the personalized information reservoir that is referenced by the local hyperlink is retrieved immediately from a local storage device 180 of mobile communication device 120. However, if the selected/activated hyperlink is a global hyperlink, this means that the content referenced by it is regular content that mobile communication device 120 has to retrieve through Internet 150 in the traditional way. That is, mobile communication device 120 has to transfer a request to personalization server 110 over communication path 220 for the content, and personalization server 110 has to retrieve the content from a related web server connected to Internet 150. After personalization server 110 retrieves the requested content it has to transfer it to mobile communication device 120 through communication path 220. The process of retrieving web content that is referenced by a global hyperlink is, as explained above, time consuming comparing to retrieving locally stored data units of the same or similar size by using local hyperlinks.

Performing local surfing on mobile communication device 120 requires a preparation phase that includes storage of a personalized information reservoir on storage device 180, as elaborated below. Briefly, during the preparation phase, personalization server 110 uses user profile 226 to obtain data units (the data units are shown at 213) for the user of mobile communication device 120 from various data sources. After personalized information reservoir 213 is prepared by personalization server 110 and transferred to mobile communication device 120, for storage on storage device 180, the user can use browser 246 to locally browse through the local personalized information reservoir (as stated herein, this type of browsing is referred to herein as "local surfing"). That is, "local surfing" means, in general, browsing through an information reservoir that is locally stored on mobile communication device 120 (e.g., on storage device 180). The user can also use browser 246 to surf Internet 150; i.e., through personalization server 110 in a conventional way. As explained above, this type of browsing is referred to herein as "global surfing".

Assuming that server personalization 110 is configured to create user profile 226, processor 212 learns surfing patterns and preferences of the user of mobile communication device 120 by receiving related information, for example, from user-operable computing system 130, or from mobile communication device 120, or from both mobile communication device 120 and user-operable computing system 130. Personalization server 110 then uses the information to compile a list of key terms. In this example, the key terms are stored in KTT 227. Alternatively, personalization server 110 receives all or part of the key terms from user-operable computing system 130, for example. Additionally or alternatively, processor 212 may monitor data/information/content that traverse personalization server 110 (e.g., HTML pages that traverse web server 224), detect therein key terms, and add them to KTT 227.

Personalization server 110 may apply known data mining techniques and known statistics tools to evaluate the surfing information, the surfing-related information and the contents, and use the evaluation results to compile a profile of the usage of user-operable computing system 130 and/or mobile communication device 120 by their user. Briefly, "data mining" involves extracting useful information from large data sets or databases. Statistics tools may be used, for example, to find how many times a particular textual expression (e.g., "car", "Sea World", "Planet Earth") was used (e.g., input) by the user or included in content requested (i.e., consumed) by the user from Internet 150.

Personalization server 110 may use predetermined key-term criteria rules to determine whether a textual expression can be regarded as a "key term". The predetermined key-term criteria rules may be based, for example, on the number of times a textual expression is included in a document (e.g., 15 times); or on the "density" of the textual expression within the document (e.g., at least three times in a line, at least five times in a paragraph, a total of at least ten times in three consecutively requested documents, etc.), etc. The predetermined key-term criteria rules may be similar to search rules used by any existing search engine. For example, the predetermined key-term criteria rules may be similar to Google's search rules.

By way of example, if processor 212 detects the word "aviation" in an HTML page that is requested by the user and "aviation" is listed (e.g., in KTT 227) as a key term, processor 212 may use TTM 222 to mark the word "aviation" in the HTML page in a manner to link it (i.e., to reference) any data unit that contains the word "aviation" more than a predetermined number of times (e.g., more than three times). This way, an HTML page (and likewise a non web page) that is requested by the user of mobile communication device 120 can be linked to a data unit that is stored locally on mobile communication device 120.

Processor 212 uses the key terms listed in KTT 227 to retrieve data units 213 for mobile communication device 120 from various data/information sources. Processor 212 retrieves each of data units 213 from a proprietary information information/bank, which may be local (i.e., reside in server 110) or remote, and/or from remote information/data sources that reside in remote web sites if the data unit includes a listed key term a predetermined number of times or more.

Because the key terms which processor 212 uses to retrieve data units 213 are associated with (i.e., they are part of) user profile 226 that is unique to the user of mobile communication device 120, data units 213 can be regarded as personal to that user. After processor 212 retrieves data units 213, it transfers them (i.e., a copy thereof) to mobile communication device 120, via communication path 220, where they are stored, for example on storage device 180. The data units transferred (i.e., copied) to storage device 180 are shown in FIG. 2 at 213'.

Typically, data units are files whose original file names are given by the files' originators. Nevertheless, as part of the transfer and storage of personalized information reservoir 213 in mobile communication device 120, processor 212 may rename data units by using the pertinent key terms. For example, if processor 212 decides that a particular data unit should be part of personalized information reservoir 213 because the particular data unit includes the key term "aviation history", processor 212 may store the file of that data unit in mobile communication device 120 under (i.e., using) the file name "Aviation History". In other words, a data unit within data units 213' that is referenced by a particular key term in another data unit or in an HTML page may be called by using a file name that is identical or similar to the particular key term. Using key terms to name the files of the data units referenced by them facilitates an easy retrieval of the data units.

Regardless of whether processor 212 already sent personalized information reservoir 213 to mobile communication device 120 or not, processor 212 may dynamically update user profile 226 based on or in response to receiving new/additional/real-time user's activity information that processor 212 may receive or monitor occasionally, periodically or intermittently, and update personalized information reservoir 213 accordingly. Then, processor 212 updates information reservoir 213'. Processor 212 may send to mobile communication device 120 only new/additional data units (and, optionally, delete outdated data units). Alternatively, processor 212 may replace the entire (outdated) personalized information reservoir in mobile communication device 120 with the most updated version of personalized information reservoir 213. Processor 212 may update or replace the entire user profile 226 with an updated user profile, or it may update only KTT 227 or only Tagging Rules 228.

Processor 212 may store a web page retrieved 256 by web server 224 in personalized information reservoir 213 as is (i.e., without marking/tagging any of its terms), as shown at 280. If the web page includes one or more key terms, processor 212 may instruct TTM 222 to mark the key terms in the web page and to store 282 the web page, with the marked key terms, in personalized information reservoir 213.

The user of mobile communication device 120 can use browser 246 to retrieve and display any of data units 213' in two ways: (1) as part of a "global surfing" (i.e., while the user surfs Internet 150), or (2) as part of a "local surfing" (i.e., while the user surfs the locally stored personalized information reservoir). The way data units 213' are used while the user of mobile communication device 120 performs global surfing and local surfing is described below.

If the user of mobile communication device 120 requests an HTML page from a web site by using a global hyperlink in an HTML page or in a data unit that is displayed on mobile communication device 120, then a global surfing is performed. During global surfing browser 246 transfers the request for an HTML page to web server 224 of personalization server 110 via communication paths 220 and 165. In response to receiving the request for the HTML page, web server 224 forwards the request to the relevant web site via Internet 150 and, in return, web server 224 receives the requested HTML page.

A conventional server would send an HTML page to a requesting end (e.g., to mobile communication device 120) as is. However, unlike conventional servers, personalization server 110 searches for key terms (i.e., it searches for terms that match or resemble key terms that are held in KTT 227) in every, or in selected, incoming web pages, and if a requested web page contains such a term, this term would be used to redirect the user (i.e., to link the web page) to a data unit that is stored on storage device 180. Therefore, before web server 224 sends the retrieved HTML page to mobile communication device 120, processor 212 compares terms in the content of the HTML page to the key terms held in KTT 227. Processor 212 uses TTM 222 to analyze the content of the web page textually. Therefore, web server 224 forwards 225 the retrieved HTML page to TTM 222 for textual analysis.

If TTM 222 finds in the HTML page a term that is identical or similar to a key term that is held in KTT 227, TTM 222 searches in Tagging Rules 228 for a tagging rule that applies to that key term. In general, key terms may be grouped according to their context (e.g., medicine terminology, car parts, etc.), and different tagging rules may be associated with different groups of key terms. For example, a tagging rule may be associated with a group of medications or drugs terms; another tagging rule may be associated with diseases terms, etc.

A tagging rule that applies to a particular key term, or to a particular group of key terms, specifies to TTM 222 how to modify the pertinent term, and which data unit among data units 213' the term should reference. For example, if the term is 'second hand cars', a tagging rule applying to that term may mark the term in a way that it would appear on display device 190 of mobile communication device 120 with a predetermined background (e.g., with a yellow background). Alternatively or additionally, the tagging rule may link the term to specific one or more data units in data units 213' that contain information pertaining to second hand cars. For example, a data unit may contain a table of second hand cars selling table; another data unit may contain prices of used cars, etc. If a tagging rule links a term to two or more data units, the tagging rule specifies how each data unit should be displayed relative to the other data units. For example, if a tagging rule links a term to two data units, the two data units may be displayed adjacent horizontally or vertically, or they may partly overlap, or one data unit may be displaced relative to the other data unit, etc. A marked term may also link to a data unit that is a widget or to an applet. Server 110 may convert each identified term/expression into a hyperlink that references a particular data unit within the personal information reservoir (i.e., within data units 213').

Processor 212 instructs (i) TTM 222 to return 223 the HTML page to web server 224 with the marked term(s) and (ii) web browser 224 to transfer 252 the HTML page, with the marked term(s), to mobile communication device 120 via communication path 165. Then, browser 246 of mobile communication device 120 displays the HTML page with the marked term(s) on display device 190 of mobile communication device 120. Because TTM 222 marks terms in web pages based on the user's unique profile (e.g., based on Tagging Rules 228 of user profile 226), it is most likely that the user would be interested in using/consuming the locally stored data units that are referenced by terms that are marked as explained herein.

If the user selects, in a displayed HTML page or in a displayed data unit, a term that was marked by TTM 222, then a local surfing is performed. During local surfing, browser 246 sends a corresponding Uniform Resource Locator (URL) to a web server 270 that may run locally; i.e., on mobile communication device 120, as shown in FIG. 2, or on storage device 180. Briefly, "URL" is a type of Uniform Resource Identifier (URI) that specifies where an identified resource (e.g., a referenced data or document) is available and the mechanism for retrieving it. Then, web server 270 locates the data unit within the personalized information reservoir (i.e., within data units 213') that is referenced by the URL and transfers it to browser 246. Browser 246 then displays the data unit on display device 190 of mobile communication device 120. However, if the user selects in the HTML page a term that was not marked by TTM 222, a global surfing is performed, during which surfing browser 246 sends a corresponding URL to web server 224 of personalization server 110 in a conventional way, as explained in more detail above. Any data unit of data units 213' may not include any hyperlink, or it may include only global hyperlinks, or only local hyperlinks, or both types of hyperlinks. Therefore, if browser 246 displays one of the data units 213', it handles it as if it were an HTML page that was transferred from web server 224 of personalization server 110, or from another web site. That is, if a term, which is marked in a displayed data unit, is selected by the user, browser 246 requests the document referenced by the marked term either from storage device 180: i.e., if the marked term is a local hyperlink, or, if the marked term is a global hyperlink, from Internet 150, for example through web server 224.

Browser 246 and web server 270 may be part of, or affiliated into, second client application 242. Processor 212, by means of, or in conjunction with, client application 216, may selectively encrypt any one of (i) data units 213, (ii) key terms table (KTT) 227, (iii) tagging rules 228, and (iii) data received from Internet 150 before it transfers them to mobile communication device 120. Second client application 242 may, therefore, be configured to decrypt any encrypted entity (e.g., data unit, encrypted key term, encrypted tagging rule, etc.) that it receives, for example from processor 212.

Figure 3:
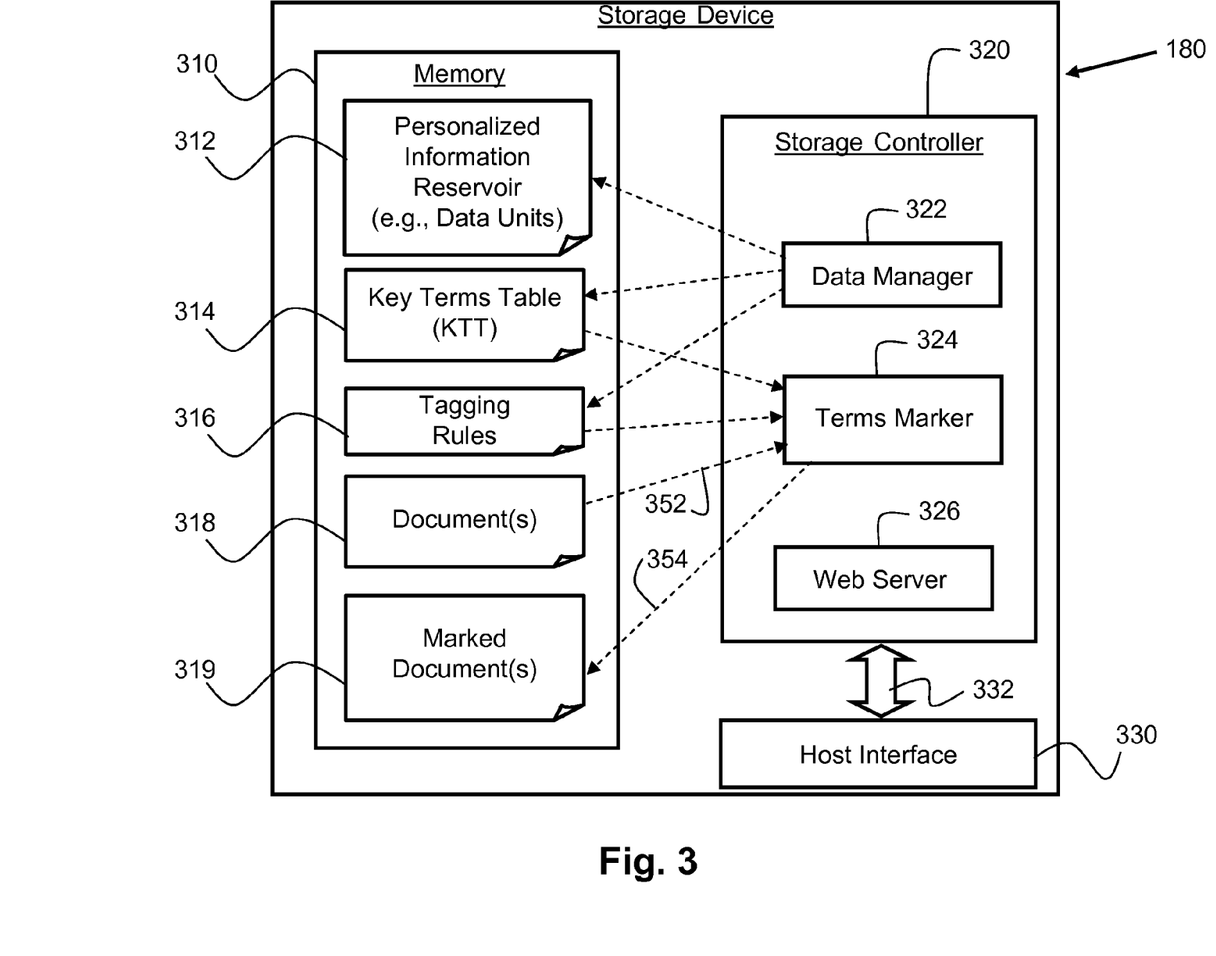
FIG. 3 is a block diagram of a storage device according to an example embodiment.

FIG. 3 is a block diagram of a storage device 180 according to an example embodiment. Storage device 180 includes a non-volatile memory 310 (e.g., a flash memory device), a storage controller 320, and a host interface 330. Storage controller 320 executes a data manager application (i.e., Data Manager 322) for managing storage of data (e.g., data units 213' of FIG. 2) in memory 310. The data to be stored in memory 310 is transferred from personalization server 110 of FIG. 1 and FIG. 2 to mobile communication device 120 that hosts storage device 180, and mobile communication device 120 transfers the data to storage controller 320 via host interface 330. Storage controller 320, then, stores the data in memory 310, as explained in more detail below.

Storage controller 320 may also execute a terms marker application (the terms marker application is shown as Terms Marker 324) to storage controller 320 to select and mark terms in; e.g., data units and in documents that are stored in Document(s) 318. Storage controller 320 also executes a web server application (i.e., Web Server 326). Web Server 326 is an application that, in general, communicates with browsers using HTTP; i.e., Web Server 326 receives and uses URLs to retrieve information (e.g., data units). Web Server 326 receives requests from browser 246 of mobile communication device 120 for data units (i.e., it receives URLs of the data units) via host interface 330, and responds to each request by retrieving a requested data unit from memory 310 (i.e., by using the pertinent URL) and transferring it, via host interface 330, to browser 246 of mobile communication device 120. Browser 246, then, displays the data unit on display device 190 of mobile communication device 120. Web Server 326 may be a stand alone application, or it may be part of the data manager application (i.e., part of Data Manager 322).

As explained above, an initial personalized information reservoir has to be stored in storage device 300 during the preparation phase described above and, if required or desired, updated thereafter. Therefore, during the preparation phase, which may be regarded as an initialization phase, storage device 180 receives information through mobile communication device 120 and host interface 330 that contains the personalized information reservoir initially created by personalization server 110. Thereafter, personalization server 110 may send an updated version of the personalized information reservoir. The information transferred from personalization server 110 to storage device 180 also contains the key terms and tagging rules that pertain to the used personalized information reservoir. Data manager 322 parses the information transferred from personalization server 110 in a manner to distinguish between the personalized information reservoir, key terms, and tagging rules. Then, data manager 322 stores the personalized information reservoir in memory 310 as Personalized Information Reservoir 312, the key terms as Key Terms Table 314, and the tagging rules as Tagging Rules 316.

The user of the host (e.g., mobile communication device 120) of storage device 180 may store one or more documents (e.g., Microsoft Word documents, electronic mails, etc.), shown as Document(s) 318, in memory 310, and storage controller 320 may use Key Terms Table 314, Tagging Rules 316, and Terms Marker 324 to mark terms in a document in Document(s) 318 in the same or similar manner as processor 212 of FIG. 2 marks terms in web pages and documents before it transfers them to mobile communication device 120. In order to mark a particular document of Document(s) 318, Terms Marker 324 retrieves 352 the particular document from Document(s) 318, uses Key Terms Table 314 to identify terms that can or should be marked and, upon finding these terms, marks the terms using Tagging Rules 316. Storage controller may then store 354 the document in Marked Document(s) 319 with the marked terms.

Second client application 242, which is executed on mobile communication device 120 (see FIG. 2), may interoperate with storage controller 320 in a manner to allow the user (i) to erase a particular document in Document(s) 318 after the particular document has been marked (i.e., after terms in it have been marked) and stored in Marked Document(s) 319, or (ii) to keep the original document (i.e., the unmarked document) as well. Second client application 242 may also interoperate with storage controller 320 in a manner to allow the user to present (e.g., use, display) any version of the document; i.e., a marked document or an unmarked document, and to undo the marking of a marked document.

Figure 4:
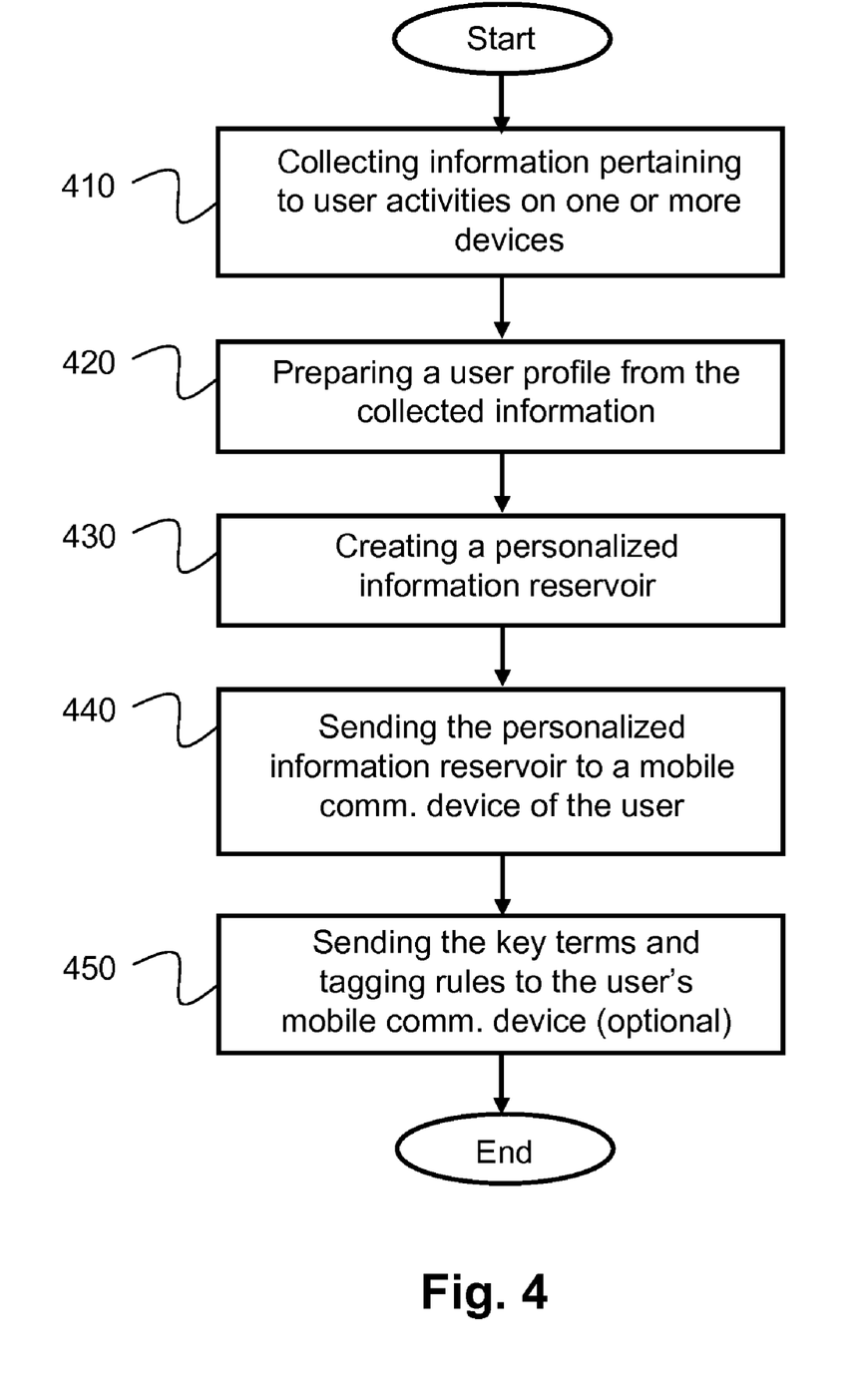
FIG. 4 is a method for preparing a mobile communication device for providing a personalized information reservoir according to an example embodiment.

FIG. 4 is a method for preparing a mobile communication device to provide personalized information according to an example embodiment. FIG. 4 will be described in association with FIG. 2. At step 410, processor 212 collects information that pertains to activities of a user, which are called herein "user activities", on one or more computing systems, as elaborated above. The information may pertain to activities of the user on the mobile communication device to which the personalized information reservoir is intended/provided, and/or to activities of the user on another device or system, as explained above, for example in connection with FIG. 2. The information, or part thereof, may be collected, for example, by or on mobile communication device 120 and/or by or on user-operable computing system 130, and sent to processor 212. Another part of the information or complementary information may be collected by processor 212 based, for example, on monitored data transfers that are related to the user activities.

At step 420, processor 212 creates a user profile that is unique to the user based on the information collected at step 410. As explained above, the user profile includes key terms which processor 212 uses (at step 430) to create a (personalized) information reservoir that is personal, and therefore unique, to the user of mobile communication device 120. Processor 212 creates the personal information reservoir by collecting data units, from various information/content sources, that include one or more key terms that are subject to the restrictions specified above with respect to the criteria used to determine whether a term is a key term.

After processor 212 collects the data units, or while it collects them, it may mark key terms in them (e.g., it may convert them to hyperlinks). Then, at step 440, processor 212 sends the personalized information reservoir to a mobile communication device of the user (e.g., to mobile communication device 120) and, at step 450 (an optional step), processor 212 may send a list of the key terms, and corresponding tagging rules, to the mobile communication device in order to allow the user of the mobile communication device to mark terms in documents that are displayed on a display device of the user's mobile communication device (e.g., on display device 190 of mobile communication device 120). The user may know which key terms can be used and how to mark them by causing a list of the key terms and a list of the tagging rules to be displayed to her/him on the user mobile communication device's display device.

Figure 5:
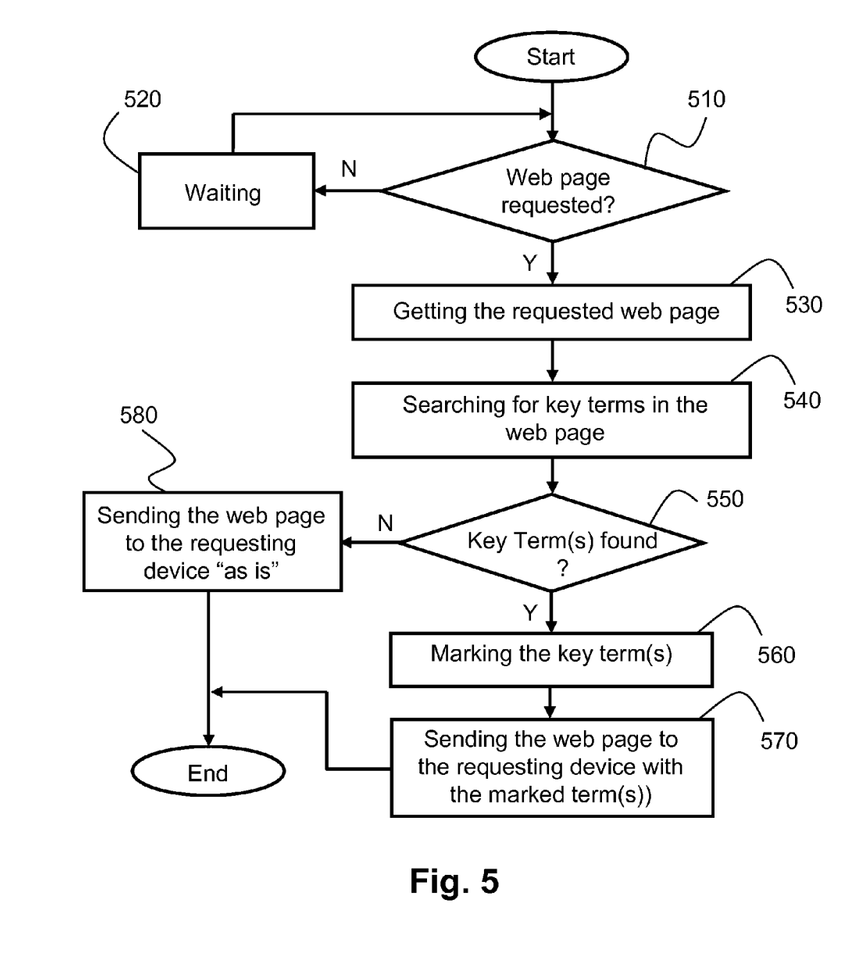
FIG. 5 is a method for handling web page requests by a server according to an example embodiment.

FIG. 5 is a method for surfing through a source of information according to an example embodiment. FIG. 5 will be described in association with FIG. 2. At step 510, processor 212 checks whether a web page is requested from mobile communication device 120. If processor 212 does not receive from mobile communication device 120 a request for a web page (sown as "N" at step 510), it waits, at step 520, for such a request. If processor 212 receives 252 a request for a web page from mobile communication device 120 (receiving the request is sown as "Y" at step 510), it instructs web server 224, at step 530, to retrieve 252 the requested web page via Internet 150. After web server 224 retrieves 252 the requested web server, processor 212 instructs TTM 222 at step 540 to search for terms in the web page which are listed in personalization server 110 (e.g., in KTT 227) as key terms. If TTM 222 finds one or more such terms in the web page (finding such terms is shown as "Y" at step 550), processor 212 uses/instructs TTM 222 to mark each of these terms at step 560. At step 570, processor 212 sends 165 the web page to mobile communication device 120 with the marked terms.

Referring again to step 550, if TTM 222 does not find in the web page any term that is a key term (i.e., according to KTT 227), or the web page includes only terms that are globally marked/tagged (shown as "Y" at step 550), processor 212 transfers 165 the web page to mobile communication device 120, via Internet 150, as is.

As explained above, a web page may not have any marked term, or it may include only globally marked terms, or only locally marked terms, or some globally marked terms and some locally marked terms. If a web page has a marked term then browser 246 handles it in the same way regardless of whether the term is marked globally or locally. The only difference between these two instances is that, if the term is marked globally, browser 246 retrieves content (e.g., another web page or document) from a remote source (usually from a web site), and if the term is marked locally, browser 246 retrieves content (e.g., a data unit) from a locally stored information; e.g., from the locally stored personalized information reservoir.

The information system described above may be used to provide an information reservoir that is compiled for a particular user, as elaborated above, or for a particular purpose. For example, an information system may be compiled for (i.e., adapted to) a company that manufactures cars. Such a system may provide data units to the employees of the cars company, whose content is directly related to, or reflects/represents, the company's activities, inventories, financial reports/status, open and close orders for spare parts, etc. The information system described herein generally provides users with richer, enhanced, and more economic surfing experience on mobile devices.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules.

What is claimed is:

1. A mobile system for providing a personalized dynamic information reservoir with data units, comprising:
    a mobile communication device;
    a storage device coupleable to the mobile communication device, the storage device configured to store an information reservoir including one or more data units, wherein each data unit is selected for inclusion into the information reservoir based upon a user profile that is associated with a user of the mobile communication device, the user profile based on one or more interactions between the user and the mobile communication device; and
    a client application executable in the mobile communication device or in the storage device, the client application configured to:
        display data including one or more terms that are identified for marking based on one or more key terms derived from the user profile and that are marked by application of a tagging rule that is determined according to a type of the data or that is predetermined by the user, wherein each marked term is selectable and wherein each marked term references a corresponding data unit that is included in the information reservoir; and
        provide the user with access to a particular data unit referenced by a particular one of the marked terms responsive to receiving an indication that the user has selected the particular marked term.

2. The mobile system as in claim 1, wherein the client application is configured to receive the data from a remote server.

3. The mobile system as in claim 1, further comprising a web server, the web server configured to:
    receive a request to access a particular data unit from a browser;
    retrieve the particular data unit from the storage device in response to the request; and
    transfer the retrieved particular data unit to the browser.

4. The mobile system as in claim 3, wherein the client application includes the browser.

5. The mobile system as in claim 3, wherein the web server resides in the storage device.

6. The mobile system as in claim 1, wherein the user profile is dynamically updatable.

7. The mobile system as in claim 1, wherein the mobile communication device is a mobile phone.

8. A server comprising:
    a processor; and
    a client application executable by the processor, the client application configured to:
        identify one or more data units based on a user profile that is associated with a user of a mobile communication device, wherein the user profile is based on one or more interactions between the user and the mobile communication device;
        receive a request from the mobile communication device for data;
        identify one or more terms for marking based on one or more key terms derived from the user profile;
        mark the one or more terms in the requested data by applying a tagging rule that is determined according to a type of the data, wherein upon marking, each marked term references a corresponding data unit; and
        in response to the request, transfer the requested data, including the marked terms, to the mobile communication device.

9. The server as in claim 8, further comprising a web server, wherein the requested data is transferred to the mobile communication device via the web server.

10. The server as in claim 8, wherein the client application is operable to create the user profile based on information received from the mobile communication device.

11. The server as in claim 8, wherein the client application is operable to create the user profile based on interaction of the user with the mobile communication device.

12. A server comprising:
    a processor;
    a term tagging module for marking terms in data; and
    a client application executable by the processor to:
        obtain data units by using key terms that are derived from a user profile that is unique to a user of a mobile communication device, wherein the user profile is based on one or more interactions between the user and the mobile communication device;
        create an information reservoir with the data units based on the user profile;
        send the data units in the information reservoir to the mobile communication device to be stored therein;
        receive from the mobile communication device a request for the data;
        identify the terms to be marked in the requested data based on the key terms;
        mark the identified terms in the requested data by applying a tagging rule using the term tagging module, such that each marked term references a particular data unit that is stored, or to be stored, in the mobile communication device; and
        transfer the requested data with the marked terms and the key terms to the mobile communication device.

13. The server as in claim 12, wherein the client application is further configured to encrypt any one of selected data units and the data.

14. The server as in claim 12, wherein the tagging rule is predetermined by the user of the mobile communication device.

15. The server as in claim 12, wherein the tagging rule is determined according to a type of the requested data.

16. A storage device comprising:
a memory; and
a storage controller configured to:
- store, in the memory, an information reservoir including one or more data units, wherein each data unit is selected for inclusion into the information reservoir based upon a user profile that is associated with a user, wherein the user profile is based on one or more interactions between the user and a host;
- receive and store key terms, wherein the key terms are received from the host, and wherein each key term is identified with the user based on the user profile;
- identify and mark, by applying a tagging rule that is determined according to a type of data, one or more terms in a file stored in the memory based on the stored key terms, wherein each marked term references a corresponding data unit;
- provide the file to the host in response to receipt of a request from the host;
- receive an indication that a particular marked term of the one or more marked terms in the file is selected; and
- transfer, to the host, the data unit corresponding to the particular marked term in response to receipt of the indication of the selection of the particular marked term.

17. The storage device as in claim 16, wherein one of the data units is encrypted, and wherein a data manager application in the storage controller is configured to decrypt the encrypted data unit.

18. The storage device of claim 16, wherein the information reservoir is dynamically updatable based on the user profile.

19. The storage device of claim 16, wherein the user profile is dynamically updatable.

20. The mobile system of claim 1, wherein the information reservoir is dynamically updatable based on the user profile.

21. The mobile system of claim 1, wherein the user profile is determined automatically by a personalization server.

22. The server of claim 8, wherein the user profile is determined automatically by a personalization server.

23. The server of claim 8, wherein the user profile is dynamically updatable.

24. The server of claim 8, wherein the identified one or more data units are stored in an information reservoir within the mobile communication device, and wherein the information reservoir is dynamically updatable based on the user profile.

25. An apparatus comprising:
a storage device embedded in a mobile communication device, the storage device configured to store an information reservoir including one or more data units, wherein each data unit is selected for inclusion into the information reservoir based upon a user profile that is associated with a user of the mobile communication device, wherein the user profile is based on one or more interactions between the user and the mobile communication device; and
a client application configured to:
- display data to the user, the data including one or more terms that are identified for marking based on one or more key terms derived from the user profile and that are marked by application of a tagging rule that is determined according to a type of the data or that is predetermined by the user, wherein each marked term is selectable and wherein each marked term references a corresponding data unit that is included in the information reservoir; and
- provide the user with access to a particular data unit referenced by a particular one of the marked terms responsive to receiving an indication that the user has selected the particular marked term.

* * * * *

UNITED STATES PATENT AND TRADEMARK OFFICE
CERTIFICATE OF CORRECTION

PATENT NO. : 8,213,912 B2
APPLICATION NO. : 12/477690
DATED : July 3, 2012
INVENTOR(S) : Itzhak Pomerantz et al.

Page 1 of 1

It is certified that error appears in the above-identified patent and that said Letters Patent is hereby corrected as shown below:

In the Claims section, Column 17, Claim 3, Line 63, "receive a request to access a particular data unit from a browser;" should read --receive a request to access the particular data unit from a browser;--.

Signed and Sealed this
Twenty-first Day of May, 2013

Teresa Stanek Rea
*Acting Director of the United States Patent and Trademark Office*